US011841526B2

(12) United States Patent
Sharlin et al.

(10) Patent No.: US 11,841,526 B2
(45) Date of Patent: Dec. 12, 2023

(54) COLOR SHIFTED OPTICAL SYSTEM FOR NEAR-EYE DISPLAYS

(71) Applicant: Lumus Ltd., Ness Ziona (IL)

(72) Inventors: Elad Sharlin, Mishmar David (IL); Ronen Chriki, Lod (IL); Yochay Danziger, Kfar Vradim (IL)

(73) Assignee: Lumus Ltd., Ness Ziona (IL)

( * ) Notice: Subject to any disclaimer, the term of this patent is extended or adjusted under 35 U.S.C. 154(b) by 18 days.

(21) Appl. No.: 18/004,284

(22) PCT Filed: Jul. 1, 2022

(86) PCT No.: PCT/IB2022/056155
§ 371 (c)(1),
(2) Date: Jan. 4, 2023

(87) PCT Pub. No.: WO2023/281369
PCT Pub. Date: Jan. 12, 2023

(65) Prior Publication Data
US 2023/0194770 A1    Jun. 22, 2023

Related U.S. Application Data

(60) Provisional application No. 63/218,331, filed on Jul. 4, 2021.

(51) Int. Cl.
*G02B 6/00* (2006.01)
*F21V 8/00* (2006.01)
*G02B 27/01* (2006.01)

(52) U.S. Cl.
CPC ....... *G02B 6/0055* (2013.01); *G02B 27/0172* (2013.01)

(58) Field of Classification Search
CPC .. G02B 6/0055; G02B 27/0172; G02B 27/01; G02B 27/0101; G02B 27/0103;
(Continued)

(56) References Cited

U.S. PATENT DOCUMENTS

| 5,096,520 A | 3/1992 | Faris |
| 6,394,607 B1 | 5/2002 | Hashizume et al. |

(Continued)

FOREIGN PATENT DOCUMENTS

| GB | 2153546 A | 8/1985 |
| JP | 2015099323 A | 5/2015 |

(Continued)

OTHER PUBLICATIONS

International Search Report and Written Opinion of the International Searching Authority for corresponding International Patent Application No. PCT/IB2022/056155, dated Nov. 30, 2022.

(Continued)

*Primary Examiner* — Wen Huang
*Assistant Examiner* — Henry Duong
(74) *Attorney, Agent, or Firm* — Renner, Otto, Boisselle & Sklar, LLP

(57) ABSTRACT

A method for generating an image in a near-eye display may include operating a light source to emit the image as incident light. The light source may be configured such that incident light as received by the light reflecting elements compensates for the chromatic reflectance of the light reflecting elements. The method may include coupling the incident light into a light-transmitting substrate, thereby trapping the light between first and second major surfaces of the light-transmitting substrate by total internal reflection and coupling the light out of the substrate by the light reflecting elements having chromatic reflectance.

24 Claims, 15 Drawing Sheets

(58) Field of Classification Search
CPC .............. G02B 27/0149; G02B 27/017; G02B 27/0176; G02B 27/0179; G02B 2027/0105; G02B 27/0189; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/0141; G02B 2027/014; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC ........................................................... 359/630
See application file for complete search history.

(56) References Cited

U.S. PATENT DOCUMENTS

| | | | |
|---|---|---|---|
| 6,829,095 | B2 | 12/2004 | Amitai |
| 9,523,852 | B1 | 12/2016 | Brown et al. |
| 9,551,880 | B2 | 1/2017 | Amitai |
| 10,302,835 | B2 * | 5/2019 | Danziger ............ G02B 27/0081 |
| 10,859,845 | B2 | 12/2020 | Kyosuna et al. |
| 2009/0122414 | A1 | 5/2009 | Amitai |
| 2010/0027289 | A1 | 2/2010 | Aiki et al. |
| 2010/0033784 | A1 | 2/2010 | Renaud Goud |
| 2012/0002256 | A1 | 1/2012 | Lacoste et al. |
| 2012/0068609 | A1 | 3/2012 | Ide et al. |
| 2013/0021581 | A1 | 1/2013 | Takahashi et al. |
| 2013/0335708 | A1 | 12/2013 | Ouderkirk |
| 2015/0288937 | A1 | 10/2015 | Tsai et al. |
| 2015/0338655 | A1 | 11/2015 | Sawada et al. |
| 2016/0170213 | A1 | 6/2016 | Amitai |
| 2016/0313567 | A1 | 10/2016 | Kurashige |
| 2017/0276947 | A1 | 9/2017 | Yokoyama |
| 2017/0371160 | A1 | 12/2017 | Schultz |
| 2018/0039082 | A1 * | 2/2018 | Amitai ................ G02B 27/148 |
| 2018/0120768 | A1 | 5/2018 | Christmas |
| 2018/0129166 | A1 | 5/2018 | Seo et al. |
| 2018/0143509 | A1 | 5/2018 | Oh |
| 2018/0180892 | A1 | 6/2018 | Yoshida |
| 2018/0188532 | A1 | 7/2018 | Christmas |
| 2018/0210202 | A1 | 7/2018 | Danziger |
| 2018/0262725 | A1 | 9/2018 | Fan |
| 2018/0284448 | A1 | 10/2018 | Matsuki et al. |
| 2018/0292592 | A1 | 10/2018 | Danziger |
| 2018/0335629 | A1 | 11/2018 | Cheng et al. |
| 2019/0056593 | A1 | 2/2019 | Bablumyan |
| 2020/0183159 | A1 | 6/2020 | Danziger |
| 2020/0209667 | A1 | 7/2020 | Sharlin et al. |
| 2020/0278554 | A1 | 9/2020 | Schultz et al. |
| 2022/0197037 | A1 | 6/2022 | Pennell et al. |
| 2022/0317467 | A1 | 10/2022 | Danziger |
| 2022/0342216 | A1 | 10/2022 | Danziger et al. |
| 2022/0373807 | A1 | 11/2022 | Danziger et al. |
| 2023/0019309 | A1 | 1/2023 | Chriki et al. |

FOREIGN PATENT DOCUMENTS

| | | |
|---|---|---|
| JP | 2017146494 | 8/2017 |
| WO | 2021044409 A1 | 3/2021 |
| WO | 2021124315 A1 | 6/2021 |

OTHER PUBLICATIONS

Lynch, et al. "Beam Manipulation: Prisms Vs. Mirrors," Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).

M. Kivanc Hedili, et al. "Light-efficient augmented reality display with steerable eyebox," Optics Express vol. 27, Issue 9, p. 12572-12581 (2019) -https://doi.org/10.1364/OE.27.012572.

* cited by examiner

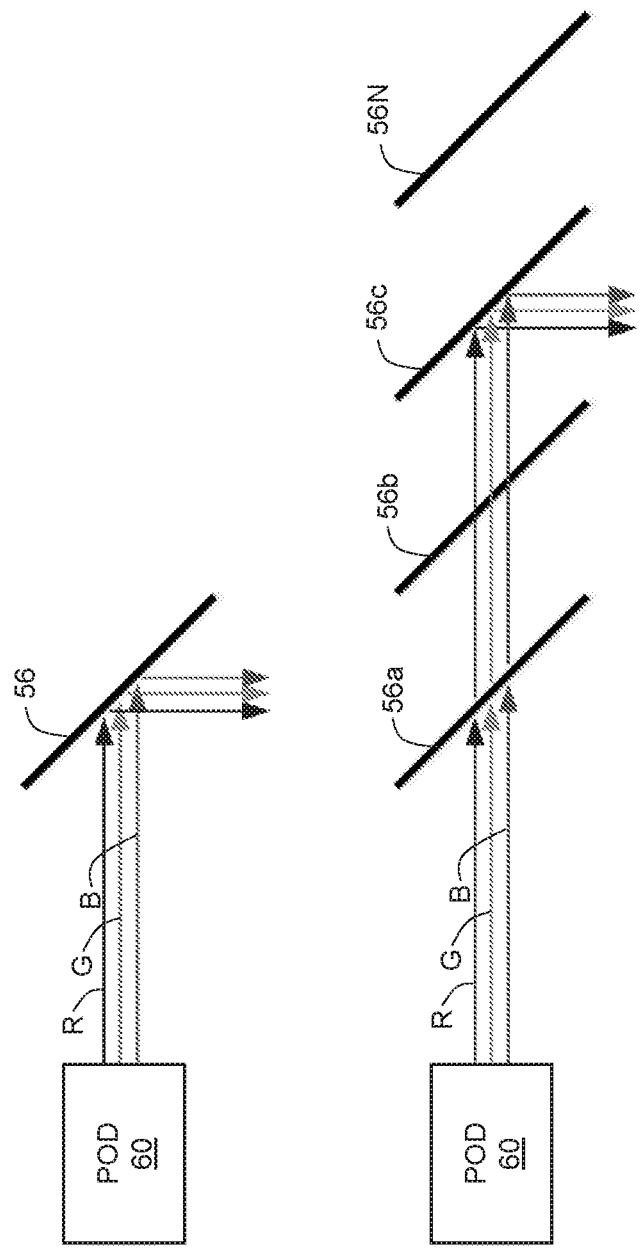

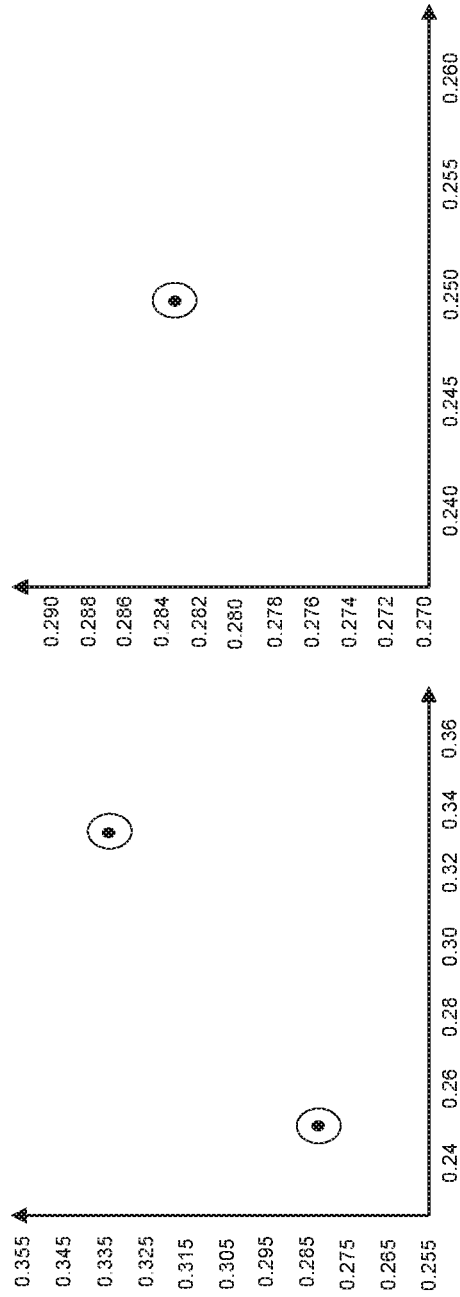

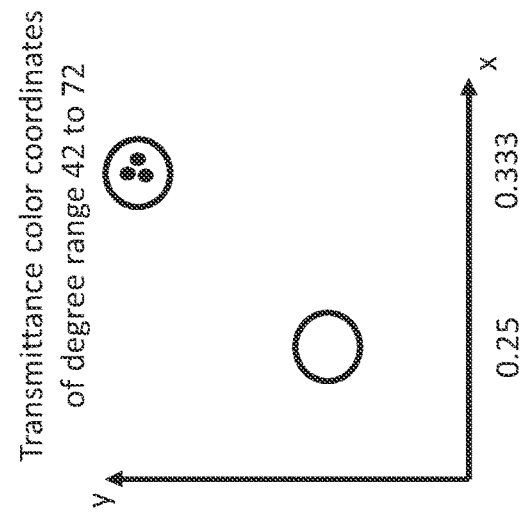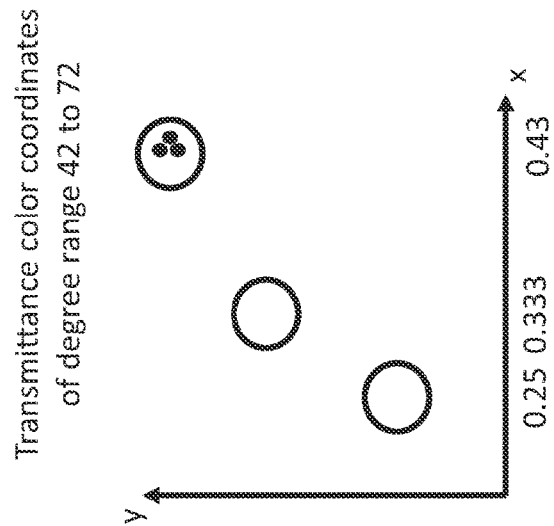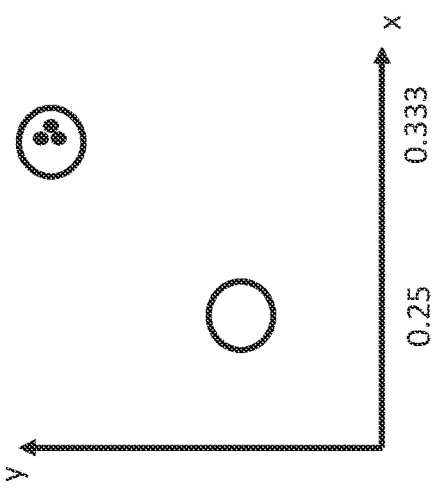
FIG. 5D White balanced RGB
FIG. 5E Color shift balanced RGB

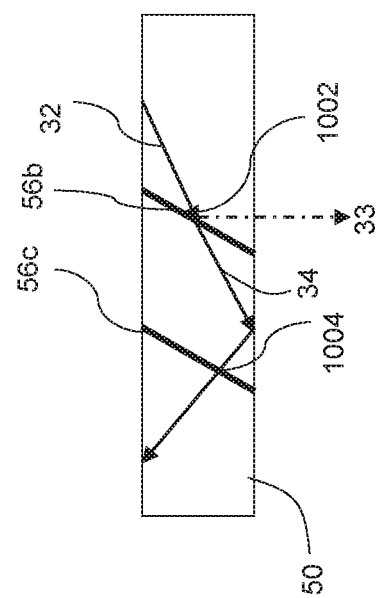

COLOR SHIFTED OPTICAL SYSTEM FOR NEAR-EYE DISPLAYS

This application is a national phase of International Application No. PCT/IB2022/056155 filed Jul. 1, 2022, which claims priority to U.S. Provisional Application No. 63/218,331 filed Jul. 4, 2021, each of which is hereby incorporated herein by reference in its entirety.

Near-eye displays (NED) are now a staple in various applications. Head mounted displays (HMD) such as, for example, augmented reality displays typically include a near-eye transparent or semi-transparent display through which a user may see the surrounding environment while simultaneously also seeing virtual objects (e.g., text, graphics, video, etc.) that appear as part of, and/or overlaid upon, the surrounding environment.

Consumer requirements for better and more comfortable human computer interfaces have created demand for HMD with smaller form factors, wider field of view FOV, longer battery life, day time clear augmented images, etc. HMD often utilize optical waveguides to reproduce displayed virtual images the user may see in the augmented reality environment. Consumer demands have led to increasingly complicated waveguide geometries and increasingly complicated facet coatings responsible for reflecting and transmitting light that propagates through the optical waveguide. As form factor, manufacturability, intensity, achromaticity, and image uniformity demands increase, coating requirements become increasingly challenging to design and manufacture.

Therefore, there is a need in the art for NED with improved form factor, manufacturability, intensity, achromaticity, and image uniformity that also alleviate coating requirements.

SUMMARY OF THE INVENTION

The present disclosure relates to optical systems for use in a NED employing a design approach which uses a non-white balanced light source and complementary white normalized partially reflective facet coatings. The ability to manipulate light source color and matching facet reflectance allows an additional degree of freedom in design, which leads to better manufacturability, more efficient light throughput, and smaller overall form factor.

In accordance with an embodiment, an optical system may include a light-guide optical element (LOE) including a light-transmitting substrate having first and second major surfaces parallel to each other, one or more light input coupling elements configured to couple incident light into the light-transmitting substrate thereby trapping the light between the first and second major surfaces by total internal reflection, and one or more light reflecting elements configured to couple the light out of the substrate, the one or more light reflecting elements having chromatic reflectance for coupling the light further down the substrate or out of the substrate. The system may also include a light source configured to emit the incident light such that the incident light as received by the one or more light reflecting elements compensates for the chromatic reflectance of the one or more light reflecting elements.

In one embodiment, the light source includes a light projector configured to emit the incident light chromatically to compensate for the chromatic reflectance of the one or more light reflecting elements.

In another embodiment, the light source includes a light projector configured to emit the incident light such that relative intensities of distinct light elements that compose the light projector compensate for the chromatic reflectance of the one or more light reflecting elements.

In yet another embodiment, the light source includes an RGB projector configured to emit the incident light such that relative intensities of red, green, and blue light sources that compose the RGB projector compensate for the chromatic reflectance of the one or more light reflecting elements.

In one embodiment, the light source includes a light projector configured to emit light achromatically, and a mirror having chromatic reflectance and thus configured to receive the emitted light from the light projector and reflect it to compensate for the chromatic reflectance of the one or more light reflecting elements.

In another embodiment, the light source includes a light projector configured to emit light achromatically, and a filter having chromatic transmittance and thus configured to receive the emitted light from the light projector and transmit it to compensate for the chromatic reflectance of the one or more light reflecting elements.

In yet another embodiment, the light source includes a light projector configured to emit light chromatically, and a mirror having chromatic reflectance and thus configured to receive the emitted light from the light projector and reflect it to compensate for the chromatic reflectance of the one or more light reflecting elements.

In yet another embodiment, the light source includes a light projector configured to emit light chromatically, and a filter having chromatic transmittance and thus configured to receive the emitted light from the light projector and transmit it to compensate for the chromatic reflectance of the one or more light reflecting elements.

In one embodiment, the light source includes a light projector configured to emit the incident light such that relative intensities of distinct light elements that compose the light projector compensate for the chromatic reflectance of the one or more light reflecting elements, the relative intensities of the distinct light elements selected to maximize overall efficiency of the light projector.

In another embodiment, the light source includes a light projector configured to emit the incident light such that relative intensities of distinct pixels projected by the light projector compensate for the chromatic reflectance of the one or more light reflecting elements.

In one embodiment, the one or more light reflecting elements include a coating having chromatic reflectance.

In another embodiment, the one or more light reflecting elements include a coating having chromatic reflectance and achromatic transmittance.

In accordance with another embodiment, a method for generating an image in a near-eye display may include operating a light source to produce the image as incident light, coupling the incident light into a light-transmitting substrate thereby trapping the light between first and second major surfaces of the light-transmitting substrate by total internal reflection, and coupling the light out of the substrate by one or more light reflecting elements having chromatic reflectance. The light source is configured to produce the incident light chromatically such that the incident light as received by the one or more light reflecting elements compensates for the chromatic reflectance of the one or more light reflecting elements.

In one embodiment, the light source produces the incident light such that relative intensities of distinct light elements that compose the light source compensate for the chromatic reflectance of the one or more light reflecting elements.

In another embodiment, the light source produces the incident light such that relative intensities of red, green, and blue light sources that compose the light source compensate for the chromatic reflectance of the one or more light reflecting elements.

In one embodiment, operating the light source to produce the image as the incident light includes emitting light achromatically, and reflecting the emitted light using a mirror having chromatic reflectance to compensate for the chromatic reflectance of the one or more light reflecting elements.

In another embodiment, operating the light source to produce the image as the incident light includes emitting light achromatically, and filtering the emitted light using a filter having chromatic transmittance to compensate for the chromatic reflectance of the one or more light reflecting elements.

In yet another embodiment, operating the light source to produce the image as the incident light includes emitting light chromatically, and reflecting the emitted light using a mirror having chromatic reflectance to compensate for the chromatic reflectance of the one or more light reflecting elements.

In yet another embodiment, operating the light source to produce the image as the incident light includes emitting light chromatically, and filtering the emitted light using a filter having chromatic transmittance to compensate for the chromatic reflectance of the one or more light reflecting elements.

In one embodiment, the light source emits the incident light such that (a) relative intensities of distinct light elements that compose the light source compensate for the chromatic reflectance of the one or more light reflecting elements and (b) the relative intensities of the distinct light elements maximize overall efficiency of the light source.

In another embodiment, the light source emits the incident light such that relative intensities of distinct pixels projected by the light source compensate for the chromatic reflectance of the one or more light output coupling elements.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIGS. 3A and 3B illustrate schematic diagram of exemplary optical systems for a near-eye display (NED).

FIG. 4A illustrates an exemplary table specifying requirements for a coating having shifted color coordinates for reflectance and white-balanced coordinates for transmittance.

FIGS. 4B and 4C illustrate a portion of a CIE 1931 XYZ color space gamut showing exemplary reflectance color coordinates over the angular range of 42°-72° and transmittance color coordinates over the angular range of 74°-85°.

FIGS. 5D and 5E illustrate exemplary color space plots of resulting reflected and transmitted light for a color-shifted coating while illuminated by a white-balanced RGB light source and a color-shifted RGB light source, respectively.

FIG. 11A illustrates a schematic diagram for an exemplary method for designing coatings for facets of a light-guide optical element.

DETAILED DESCRIPTION

Figure 1A:
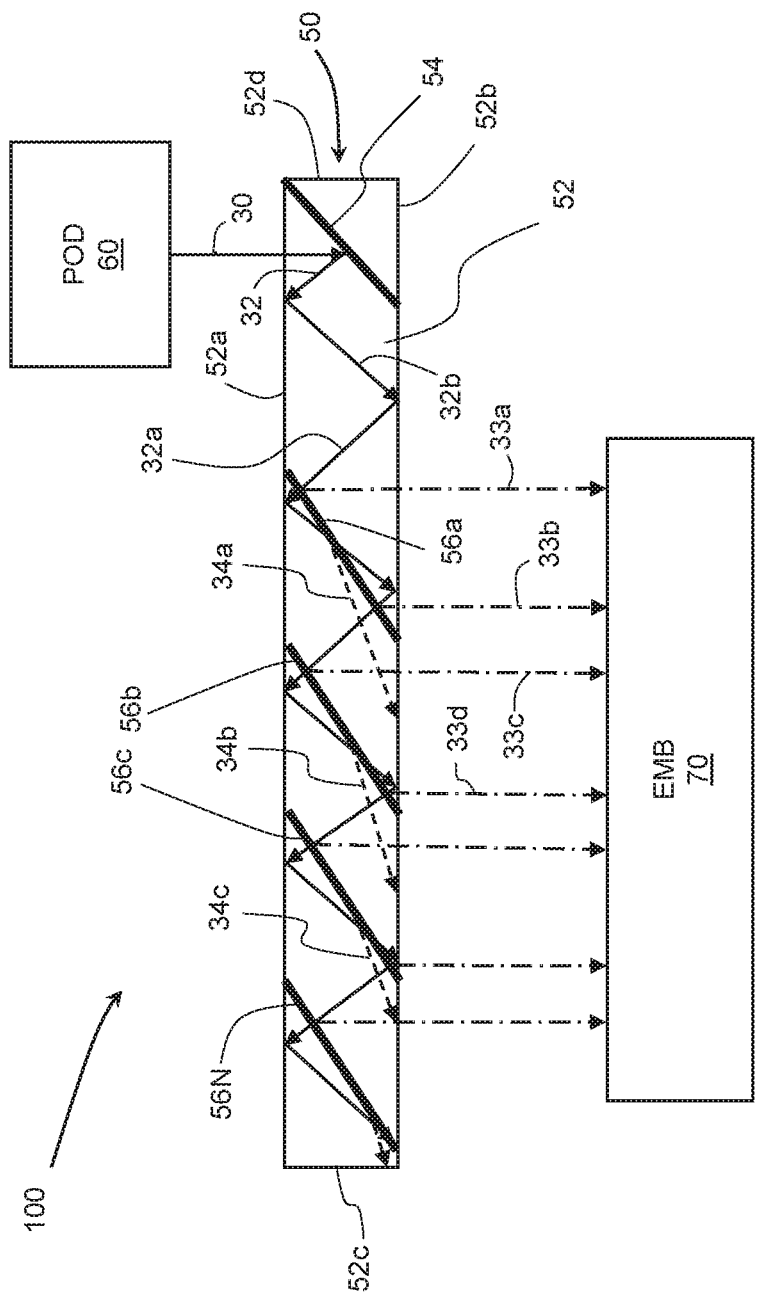
FIG. 1A illustrates a schematic diagram of an exemplary optical system for a near-eye display (NED).

FIG. 1A illustrates a schematic diagram of an exemplary optical system 100 for a near-eye display (NED).

The optical system 100 includes a light-guide optical element (LOE) 50 otherwise known as a waveguide or a lightguide. Examples of LOE 50 are described in significant detail in, for example, U.S. Pat. Nos. 7,643,214 and 7,724,442 to Amitai. FIG. 1A shows a cross-sectional view of the LOE 50. The LOE 50 includes a light-transmitting substrate 52 having first and second major surfaces 52a, 52b parallel to each other and edges 52c, 52d.

The LOE 50 also includes a plane surface 54 that is non-parallel to the first and second major surfaces 52a, 52b. The surface 54 couples light (represented by ray 30) incident thereupon into the light-transmitting substrate 52. The surface 54, may be reflective or diffractive and, thus, may reflect or diffract the light 30 (reflection represented by ray 32) and thereby trap the light between the first and second major surfaces 52a, 52b by total internal reflection. Although in the illustrated embodiment, the surface 54 is used as the light input coupling element, in other embodiments, light may be coupled into the LOE 50 using light input coupling elements other than or in addition to reflective or diffractive surfaces such as the surface 54. For example, the edges 52c, 52d may be used as light input coupling elements. That is, light may be injected directly into the LOE 50 at one or more of the edges 52c, 52d or using a prism or similar structures. In another example, light may be coupled into the LOE 50 using refractive techniques and, thus, the light input coupling elements may include refractive elements.

The LOE 50 may also include one or more light reflecting elements. In the illustrated embodiment, the LOE 50 includes as light reflecting elements multiple partially reflecting surfaces 56 that are non-parallel to the first and second major surfaces 52a, 52b. The surfaces 56 are light output coupling elements that couple the light 32 out of the substrate 52 (output light represented by rays 33). LOE 50 may include multiple sets of facets 56, but for simplicity only one set is shown. The present disclosure describes light reflecting elements and the reflective coatings applied to the light reflecting elements in the context of the light output coupling elements 56. It should be clear, however, that light reflecting elements may be light output coupling elements or other reflective or partially reflective elements in the LOE 50 that couple light further down the LOE 50 or out of it. For example, the light reflective elements described herein may include the partially reflecting surfaces of a first waveguide that reflects light into a second waveguide as disclosed in U.S. patent application Ser. No. 16/172,897, published as US 2019/0064518, which is incorporated herein by reference.

The exemplary system 100 also includes a projecting optical device (POD) 60 that may include a Spatial Light Modulator (SLM) such as a liquid crystal display (LCD), liquid crystal on silicon (LCOS) modulator, or a digital micromirror device of a digital light processing (DLP) system, an OLED array, or an inorganic LED array. Alternatively, it can contain a Laser Beam Scanning system (LBS). The POD 60 may generate a collimated image, i.e., the light of each image pixel is a parallel beam, collimated to infinity, with an angular direction corresponding to the pixel position within the image. The image illumination, thus, spans a range of angles corresponding to an angular field of view in two dimensions, all of which may be trapped within the LOE 50 by internal reflection and then coupled out. POD 60 includes at least one light source, typically LED or lasers, which may be deployed to illuminate the SLM, such as an LCOS chip. The SLM modulates the projected intensity of each pixel of the image, thereby generating the image.

The system 100 may be presented in front of an Eye Motion Box (EMB) 70 corresponding to the location of a user's eye relative to the NED in which the system 100 is installed.

In operation, the POD 60 projects light (represented by ray 30). The POD 60 will shine light beams in many directions (fields of view) but, for simplicity of explanation, the single ray 30 is shown. The light 30 is injected into the LOE 50 and coupled into the LOE 50 by the reflecting surface 54 that reflects the image 32 to be guided by total internal reflection, represented by ascending rays 32a and descending rays 32b. As the image 32 propagates within LOE 50, it impinges on partial reflectors 56. This impingement is at two angles (e.g., a first angle corresponding to ascending rays 32a and a second angle corresponding to descending rays 32b) thereby generating two reflections. Dashed-arrows 34 represent undesired reflection. In some embodiments, undesired reflections may be at shallow angles (in this example, 74-85 degrees from vertex) while in other embodiments undesired reflections may be at non-shallow angles. The transmitted image continues to impinge at different angles on facets 56 (in this example 42-72 degrees from vertex), which reflect the image 33 (dot-dashed arrows) out of the LOE 50 onto the EMB 70.

Thus, the first facet 56a reflects out from the LOE 50 portions of the image 32 as image 33a that reaches the EMB 70. The first facet 56a also transmits portions of the image 32 and reflects portions 34a at undesired angles. The facet 56b reflects out from the LOE 50 portions of the image 32 as image 33b that reaches the EMB 70. The facet 56b also transmits portions of the image 32 and reflects portions 34b at undesired angles. The facet 56c reflects out from the LOE 50 portions of the image 32 as image 33c that reaches the EMB 70. The facet 56c also transmits portions of the image 32 and reflects portions 34c at undesired angles, and so on.

Although the principles of the present invention are disclosed herein in the context of LOE 50, a 1D expanding waveguide with reflecting facets, the system 100 may also be implemented using other type of waveguides such as, for example, waveguides with holographic gratings or diffraction gratings, liquid crystal waveguides, waveguides that expand the FOV in more than one dimension, or any other method used for NED.

Figure 1B:
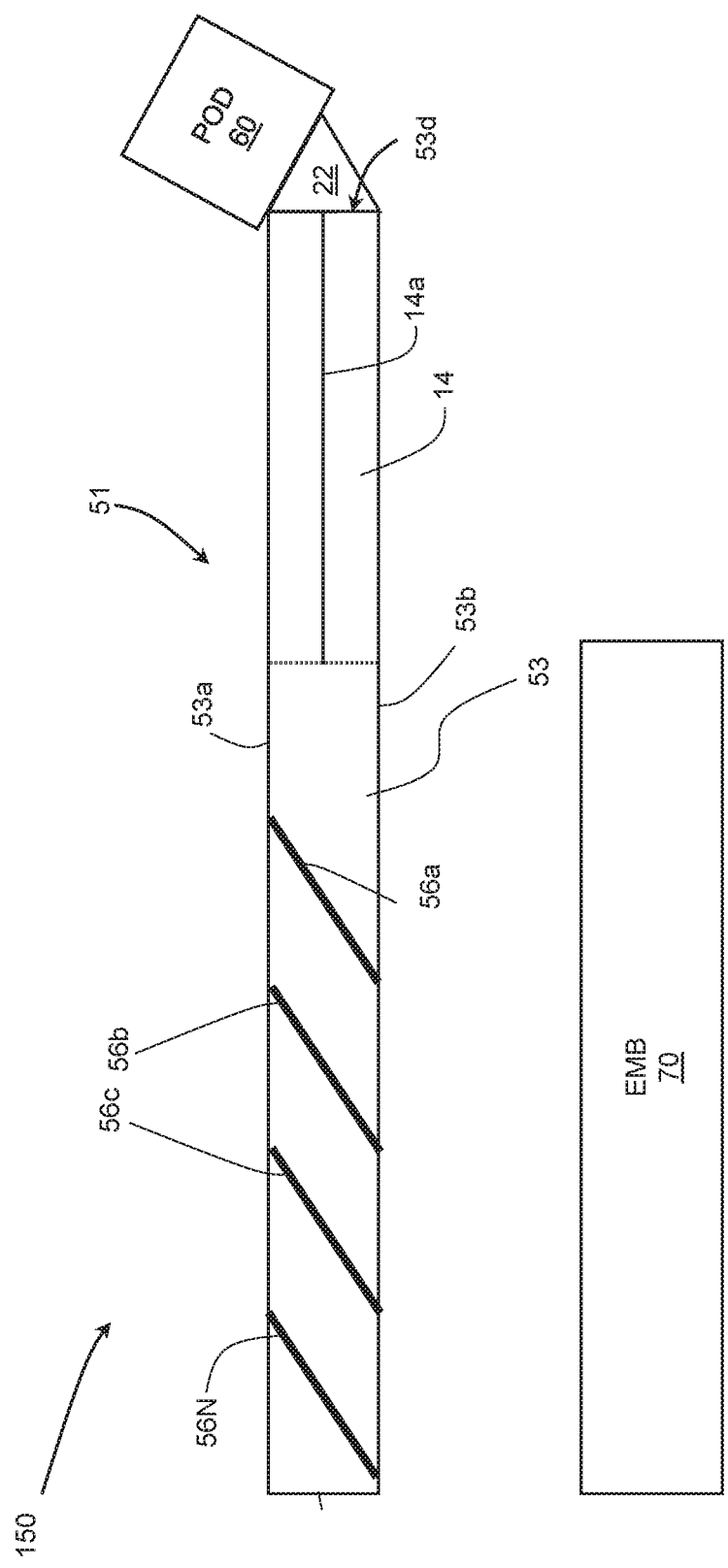
FIG. 1B illustrates a schematic diagram of another exemplary optical system for a near-eye display (NED).

FIG. 1B illustrates a schematic diagram of an exemplary optical system 150 for a near-eye display (NED). The system 150 includes a light-guide optical element (LOE) or waveguide 51 similar to the LOE 50 but having additional/different elements as described below. The system 150 is similar to the system 100 and, therefore, some components as well as light propagation of the system 150 are not described in detail here.

In exemplary system 150, a coupling prism 22 is used instead of the coupling-in surface 54 of system 100 (FIG. 1A) to couple in the image from the POD 60 into the LOE 51.

The system 150 also includes an optical mixer 14, in this case implemented as a semi-reflective surface 14a parallel to the major external surfaces 53a, 53b of the substrate 53. The mixer 14 splits the light beam propagating in the waveguide and directs the split beam to the waveguide regions not filled by the POD 60. The surface 14a may be implemented as a non-absorbing surface with approximately 50% reflectivity for the light propagating inside the LOE 51, and with a relatively low reflectivity for the light entering the waveguide from outside the system 150, such that display transparency is not decreased. The mixer 14 is located between the coupling-in edge 53d and the light extraction area where the facets 56 reside.

In general, optical mixers such as the mixer 14 correspond to a symmetrical beam multiplier region that has n internal planar beam splitters (where n is a positive integer). Each beam splitter is internal to the LOE 51 and parallel to the major surfaces 53a, 53b. The n beam splitters subdivide the thickness of the LOE 51 between the major surfaces 53a, 53b into (n+1) layers of equal thickness. The LOE 51 and/or coupling (e.g., the prism 22) of the image projector 60 to the LOE 51 may be configured such that the image illumination entering the symmetrical beam multiplier region 14 either: (i) fills at least two of the layers with image illumination corresponding to the collimated image without a conjugate of the collimated image, or with the conjugate of the collimated image without the collimated image, or (ii) fills only one of the layers with image illumination corresponding to both the collimated image and a conjugate of the collimated image. Examples of optical mixers such as the mixer 14 are described in significant detail in, for example, U.S. patent application Ser. No. 17/420,675 (published as Pub. No. US 2022/0099885) to Ronen et al. Therefore, optical mixers such as the mixer 14 are not described in additional details here.

Beam impinging on the facets 56 can be at various angles. Reflections from the facets 56 can also be at various angles dictated by the coating of the facet. Beams can be guided or unguided.

It should be noted that the use of a coupling-in surface, a coupling prism, an optical mixer, partially reflecting out-coupling facets, etc. are not limited to any specific system described here but can in fact also be incorporated into the other embodiments described in this document.

In a conventional waveguide design, a white-balanced RGB or a white LED light source is used for POD 60 and its output light 30 is white balanced when injected into the LOE 51. This conventional design approach demands that all light output elements (e.g., partially reflecting facets 56) are coated to have achromatic reflectance and transmittance in certain angular ranges.

Figures 2A, 2B:
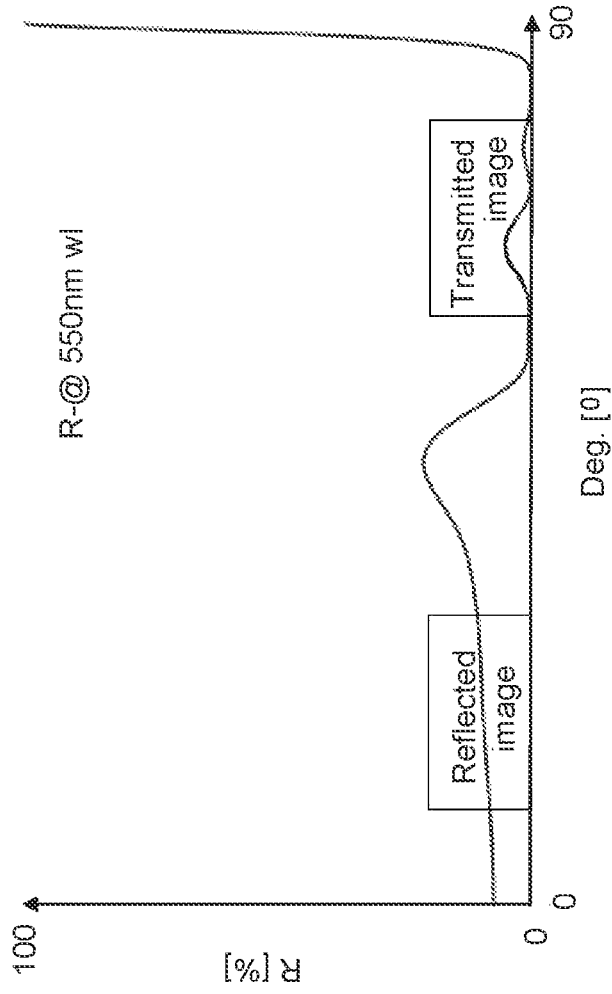
FIG. 2A illustrate an exemplary plot of percentage reflectance as a function of incidence angle for 550 nm wavelength light.
FIG. 2B illustrates an exemplary table showing transmittance and reflectance color coordinates as a function of incidence angle.

FIGS. 2A and 2B illustrate percentage reflectance as a function of incidence angle for 550 nm wavelength light in a conventional system using partially reflecting facets embedded within the waveguide. As shown in FIG. 2A, light incident at angles of 42°-72° is reflected at a high rate (Reflected image, associated with the ascending rays, 32a) to control output coupling of the image 33. Light incident at angles of 74°-85° is reflected at a low rate (Transmitted image, associated with the descending rays, 32b) with the goal of minimizing undesired reflections 34. As shown in FIG. 2B, in the conventional approach, transmittance is defined to lie in the CIE 1931 XYZ color space or gamut within a predefined color-radius (e.g., 0.01, 0.02, 0.03, 0.04, 0.05, etc.) from a purely reflected white (i.e., achromatic) color point (0.333, 0.333) for the angular range of 42°-72°. Reflectance is similarly defined to lie within a predefined color-radius (e.g., 0.01, 0.02, 0.03, 0.04, 0.05, etc.) from a purely transmitted white (i.e., achromatic) color point (0.333, 0.333) for the angular range of 74°-85°.

It is often difficult to achieve these demands, if at all possible, however. Therefore, it may be beneficial to relax the strict requirement of achromatic reflectance of the facets 56 in a manner that could still be reasonably compensated by the POD 60. In the systems 100, 150, coatings of the facets 56 may be designed to be partially chromatic but to yet allow efficient illumination of the color gamut.

Although the invention is disclosed here mostly in the context of partially-reflective elements 56, the techniques described herein also apply to other reflective elements such as the optical mixer element 14. Moreover, although we focus here on reflective elements embedded inside the waveguide, the techniques disclosed herein also apply to other elements embedded inside a waveguide. For instance, diffractive elements could be characterized by their diffraction efficiency as a function of incident angle and wavelength, and the diffraction efficiency would possess chromatic properties that could be presented in a similar manner to those of reflective elements.

Returning to FIG. 1A, the light output coupling elements 56 have chromatic reflectance for coupling light out of the LOE 50. The POD 60 emits the incident light 30 chromatically such that the incident light 32 as received by the one or more light output coupling elements 56 compensates for the chromatic reflectance of the light output coupling elements 56.

To understand the basic principles of the techniques disclosed herein, consider for simplicity the single partially reflecting surface of FIG. 3A that is illuminated by an RGB illumination module 60. If the reflectivity of the surface 56 does not depend on wavelength, the coating is said to be white-balanced, and it preserves the entire color gamut of the illumination module 60. Specifically, the output of such a system (i.e., the illumination that is reflected off the partially reflected surface 56) can be white if the relative intensities of the red R, green G, and blue B sources in the illumination module 60 are set to produces a white image. If, however, the reflectivity of the surface 56 is wavelength dependent (R=R($\lambda$) where $\lambda$ is wavelength), the surface 56 is no longer achromatic or white-balanced and it does not preserve the color gamut of the illumination module 60. Even so, a white image can be reflected off the surface 56 if the relative intensities of the RGB light sources that compose the illumination module 60 compensate for the wavelength dependent reflectance R($\lambda$) of the surface 56. Moreover, since the efficiencies of light sources of different colors vary, such a reflectance module with average reflectivity <R> can even be improved using such a method. For instance, blue LED typically have higher efficiencies than red or green LED and, therefore, a surface of average reflectivity <R> with lower reflectance at low wavelengths will typically result in higher overall efficiency.

If the surface 56 is illuminated at different incident angles, the dependence of the reflectance on incident angle (R=R($\lambda$, $\vartheta$), where $\vartheta$ is the incident angle) is also of interest. If the chromatic properties vary with incident angle, the image could again be compensated by tweaking the relative intensities of the RGB module 60 for different incident angles (e.g., by changing the RGB reflectivities of the LCOS in a LED-based module or modulating the intensities of the RGB sources in a laser scanning module). However, this would be at the price of lower efficiency and/or reduced contrast. To maintain high efficiencies, one embodiment of the invention assumes that the chromatic properties of the coating should not depend on the incident angle (or at least weakly depend on incident angle, within the relevant spectral and angular range).

Next, consider the more complicated case of FIG. 3B, a series of several such partially reflective surfaces 56a-N that are co-parallel and illuminated by an RGB illumination module 60. Light reflected from the Nth surface (where N>1) is transmitted by the first N−1 surfaces 56. If the reflectivity of the coatings is achromatic or white balanced, the transmittance is also white balanced, and the image reflected off any of the surfaces 56 will be identical in color (but not necessarily in intensity). If the reflectance of the surface 56 is chromatic or not white-balanced (R=R($\lambda$)) the image reflected off one surface 56 would differ in color from that reflected off another surface 56. One way to compensate for the difference in color from light reflected off one surface 56 versus another surface 56 would be to use different coatings for each surface 56. However, practically, if the reflectivity is sufficiently low, the transmittance could still be sufficiently white balanced, and the color of the image reflected off any of the surfaces 56 with identical coating would be approximately the same. In such cases, the image could be compensated by adjusting the relative intensities of the RGB module 60, as explained above. The maximal reflectance possible per partially reflective surface 56 depends on the number of transmitting surfaces 56 and on the degree of shift in color from white.

FIG. 4A illustrates a table specifying the requirements for a coating for a shifted color coordinate facet 56 over the entire relevant angular range of reflectance 42°-72°, while maintaining a sufficiently white balanced transmittance over the angular range of 74°-85°. The required transmittance is defined to lie in the CIE 1931 XYZ color space or gamut within a predefined/acceptable color-radius from a purely transmitted white color point (0.333, 0.333) while the required reflectance is defined to lie within a predefined/acceptable radius around the shifted color center coordinates. In the example of FIGS. 4A and 4B, the shifted color center coordinates have been set at (0.250, 0.2825).

FIG. 4B illustrates a portion of the CIE 1931 XYZ color space or gamut showing the reflectance color coordinates in the angular range of 42°-72° and the transmittance color coordinates over the angular range of 74°-85°. As is evident from FIG. 4C (magnified reflectance portion of FIG. 4B), the reflectance color points are approximately at the shifted color center coordinates (0.250, 0.2825), as chosen.

Figure 5C:
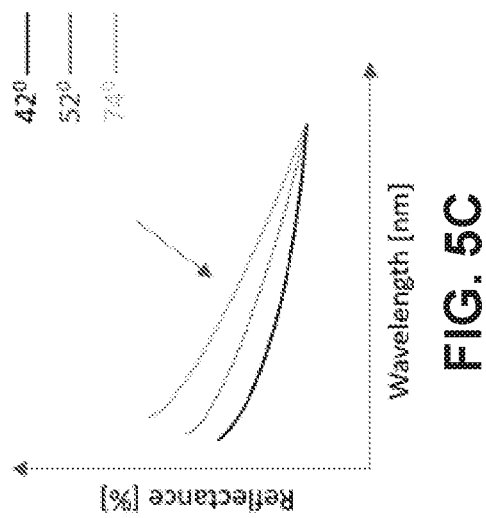
FIG. 5C illustrates a plot of exemplary percentage reflectance as a function of wavelength for a chromatic coating.
Figures 5A, 5B:
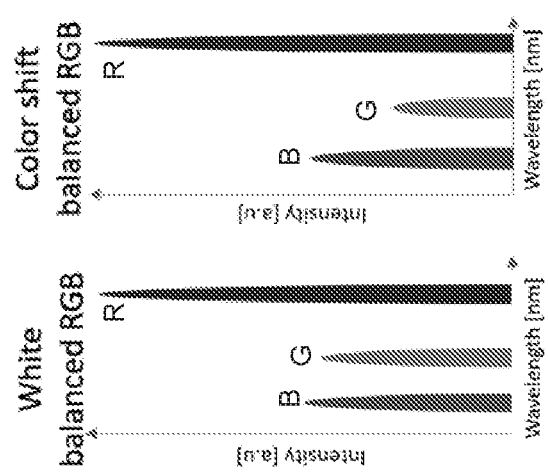
FIGS. 5A and 5B illustrates plots showing exemplary intensities of white balanced and color shifted RGB sources, respectively, for light sources.

FIGS. 5A and 5B show how the color image projected by the POD 60 may be compensated to work with the coating of FIGS. 4A to 4C. FIG. 5A illustrates intensities of red R, green G, and blue B components of a white-balanced RGB light source. FIG. 5B illustrates intensities of red R, green G, and blue B components of a color shifted RGB light source. In the illustrated embodiment, color shifting from white balance is achieved by adjusting the RGB light source to reduce the blue B and green G intensities relative to the red R intensity.

FIG. 5C illustrates a plot of percentage reflectance as a function of wavelength demonstrating that the chromatic coating reflects different wavelength light differently. So, for example, the coating reflects light projected by the color shifted RGB light source 60 as white color light.

In practice, the designer gains freedom when designing/choosing the coating. The coating's reflectance no longer needs to be strictly achromatic. The coating's reflectance may be chromatic within a certain range, relaxing the difficult demand of achromatic reflectance coatings. The designer may then adjust the light source 60 to compensate for the chromatic reflectance of the coated facet 56 and achieve white balance at the system level.

FIGS. 5D and 5E illustrate color space plots of resulting reflected and transmitted light for the color shifted coated facets while using a white-balanced RGB light source and a color-shifted RGB light source, respectively. For the white-balanced RGB light source of FIG. 5D, light reflected by the color shifted coated facet is color shifted, centered at coordinates 0.25, 0.2825 (blue light), while transmitted light remains achromatic, centered at coordinates 0.333, 0.333. For the color shift balanced RGB light source of FIG. 5E, light reflected by the color shifted coated facet is color shifted and, thus, compensates for the color shift balanced RGB light source, resulting in white-balanced reflected light, centered at coordinates 0.333, 0.333. Because reflectance of the coated facet remains generally achromatic, transmitted light corresponds to the color shift balanced light of the RGB light source, centered at coordinates 0.43, 0.36 (red light).

More generally, the color properties of a coated surface can be described in various ways. For instance, using the CIE XYZ formalism, the reflectance at angle θ with relation to the surface's norm, we can define the color tristimulus values $$X(\theta) = \frac{K}{N}\int_\lambda R_n(\theta, \lambda)I_n(\theta, \lambda)x(\lambda)d\lambda$$

$$Y(\theta) = \frac{K}{N}\int_\lambda R_n(\theta, \lambda)I_n(\theta, \lambda)y(\lambda)d\lambda$$

$$Z(\theta) = \frac{K}{N}\int_\lambda R_n(\theta, \lambda)I_n(\theta, \lambda)z(\lambda)d\lambda$$

where K is a normalization factor, $R_n$ is reflectivity of the reflective surface n we are considering, $I_n$ is the intensity incident on the reflected surface n we are considering, λ is wavelength, x, y, and z are weighting functions that describe sensitivity of the human eye (it is assumed the sensitivity of the human eye is uniform over considered angular range of the field of view), and N is defined by $$N(\theta) = \int_\lambda I(\theta,\lambda)y(\lambda)d\lambda.$$

From X, Y, Z we can define the location of the reflected signal on the color gamut and quantify the distance between the desired white point and the expected color of the reflected light. In the case of a single reflecting surface, any chromatic non-uniform behavior of the reflectance R with wavelength can be compensated by tweaking the illuminated intensity I.

Refractive waveguides are composed of many embedded partially reflective surfaces (semi-mirrors) or facets. Therefore, light generally propagates through several partially reflective surfaces before being reflected into the observer's eye. In this case, the incident intensity on the nth facet is $$I_n(\theta, \lambda) = I_0(\theta, \lambda)\prod_{i=1}^{n}T_i(\theta, \lambda)$$

where $T_i(\theta,\lambda)=1-R_i(\theta,\lambda)$ and $I_0(\theta,\lambda)$ is the intensity coupled into the waveguide. For a certain trajectory inside the waveguide, any chromaticity of the facets can, in principle, be compensated for by adjusting the intensity $I_0(\theta,\lambda)$. Adjustment of the intensity $I_0(\theta,\lambda)$ can be achieved in several ways. For instance, in flooding illumination modules with an RGB source, the ratio between the different colors can be tweaked by changing the driving power of the different colors. For flooding illumination modules with a white source, the ratio between the different colors can be controlled by placing a color filter between the source and the waveguide. In these cases, any discrepancy with angle θ can be adjusted by changing the reflectivity of the image, i.e., the reflectivity caused by the POD 60 (e.g., LCOS). In laser illumination modules or in modules based in OLED or micro-LEDs illumination sources, both the spectral and angular properties can be adjusted by controlling the intensities of the different colors at the different pixels.

However, in realistic systems, the accurate trajectory of light is unknown, and there are many possible optical paths that will eventually reach the eye motion box. Therefore, the adjustment of $I_0(\theta,\lambda)$ must compensate the chromatic properties of all possible trajectories. These requirements place an upper bound on the allowed chromaticity of the coating layers. This means, there is a certain region within which the color gamut of each of the partially reflective coatings is allowed, and beyond this region the chromaticity could not be corrected for all trajectories and fields simultaneously.

As mentioned above, adjustment of the intensity $I_0(\theta,\lambda)$ may also be implemented pixel by pixel, but this may be less favorable because it is necessarily accompanied by a reduction in efficiency and of the number of grayscales of the different colors.

Figure 6:
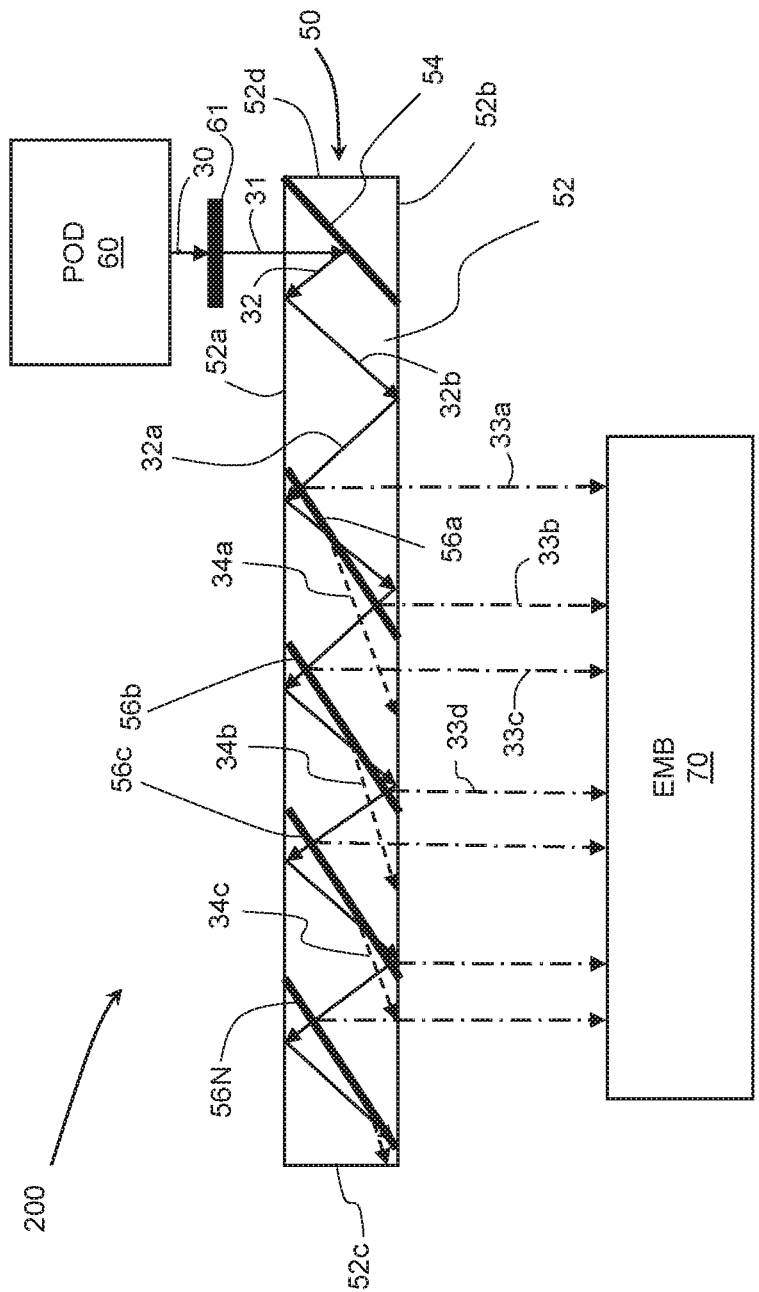
FIG. 6 illustrates a schematic diagram of another exemplary optical system for a NED.
Figure 7:
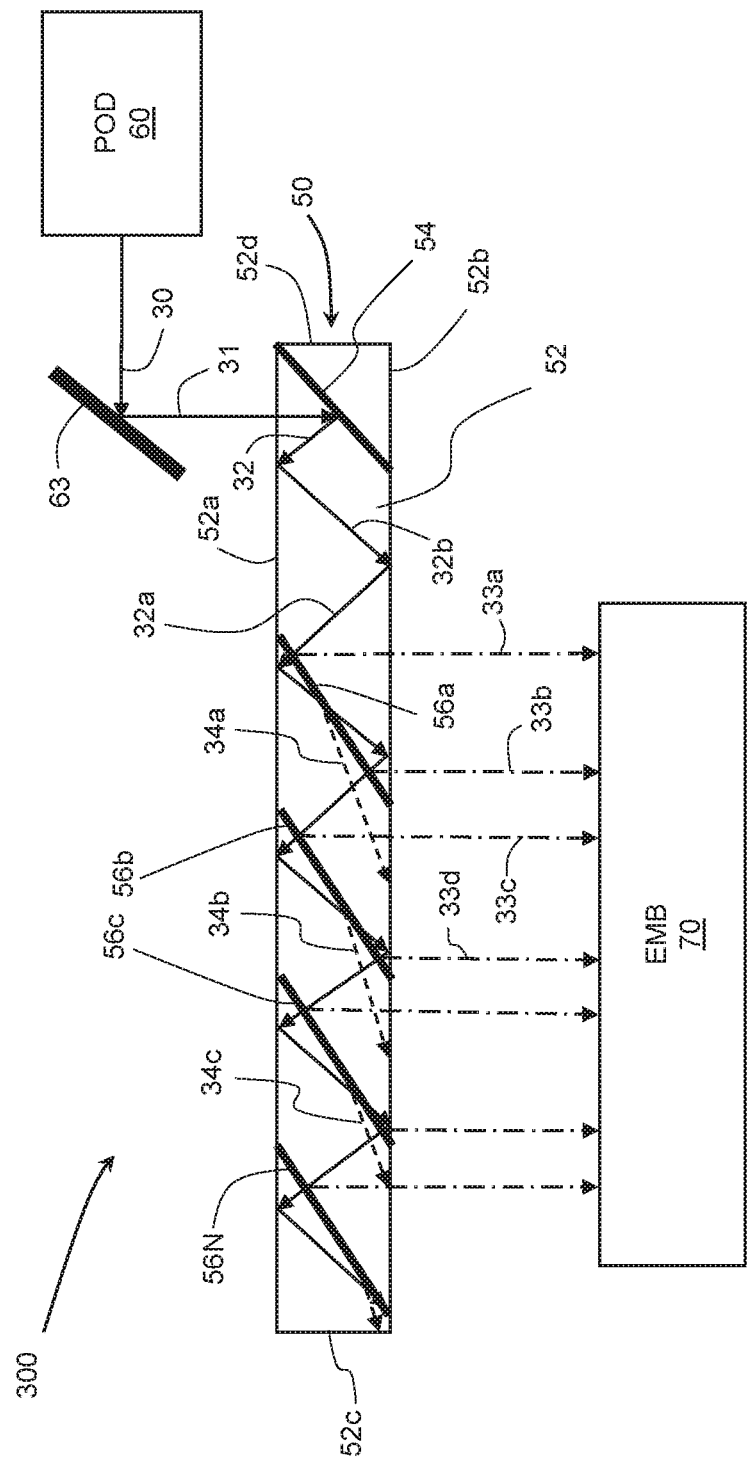
FIG. 7 illustrates a schematic diagram of yet another exemplary optical system for a NED.

FIGS. 6 and 7 illustrate other potential embodiments.

FIG. 6 illustrates a schematic diagram of an exemplary optical system 200 for a NED. The optical system 200 is similar to the optical system 100 described above and, therefore, components that are the same as those of the system 100 are no further described herein. The exemplary system 200 includes a projecting optical device (POD) 60 and a filter 61. The POD 60 may project images regularly (without adjustment to compensate for the chromaticity of the surfaces 56), white-balanced light. Instead of the POD 60 being adjusted to compensate for the color-shifted reflectance characteristics of the surfaces 56, the filter 61 is inserted between the POD 60 and the LOE 50 to compensate for the color-shifted reflectance characteristics of the surfaces 56. In one embodiment, the POD 60 may project images chromatically but the projected light, by itself, does not fully compensate for the chromaticity of the surfaces 56. The combination of the POD 60 and the filter 61 compensates for the color-shifted reflectance characteristics of the surfaces 56.

In operation, the POD 60 projects light (represented by ray 30). The filter 61 is configured to modify the light projected from the POD 60 so that the light 31 injected into the LOE 50 compensates for the color-shifted reflectance characteristics of the surfaces 56. The light 31 is injected into the LOE 50 and coupled into the LOE 50 by the reflecting surface 54 that reflects the image 32 to be guided by total internal reflection, represented by ascending rays 32a and descending rays 32b of the image 32. As the image 32 propagates within lightguide 52, it impinges on partial reflectors 56. This impingement is at two angles (e.g., a first angle corresponding to ascending rays 32a and a second angle corresponding to descending rays 32b) thereby generating two reflections. Dashed-arrows 34 represent undesired reflection at shallow angles (in this example 74-85 degrees from vertex). The transmitted image continues to impinge at different angles on facets 56 (in this example 42-72 degrees from vertex), which reflect the image 33 (dot-dashed arrows) out of the LOE 50 onto the EMB 70.

The light output coupling elements 56 of system 200 have chromatic reflectance for coupling light out of the LOE 50. The combination of the POD 60 and the filter 61 produces the incident light 31 to be chromatic such that the incident light 32 as received by the one or more light output coupling elements 56 compensates for the chromatic reflectance of the light output coupling elements 56.

FIG. 7 illustrates a schematic diagram of another exemplary optical system 300 for a NED. The optical system 300 is similar to the optical system 100 described above and, therefore, components that are the same as those of the system 100 are no further described herein. The exemplary system 300 includes a projecting optical device (POD) 60 and a mirror 63. The POD 60 may project images regularly (without adjustment to account for the chromaticity of the surfaces 56), white-balanced light. Instead of the POD 60 being adjusted to compensate for the color-shifted reflectance characteristics of the surfaces 56, the mirror 63 is inserted between the POD 60 and the LOE 50 to compensate for the color-shifted reflectance characteristics of the surfaces 56. In one embodiment, the POD 60 may project images chromatically but the projected light, by itself, does not fully compensate for the chromaticity of the surfaces 56. The combination of the POD 60 and the mirror 63 compensates for the color-shifted reflectance characteristics of the surfaces 56.

In operation, the POD 60 projects light (represented by ray 30). The mirror 63 is configured to modify the light projected from the POD 60 so that the light 31 injected into the LOE 50 compensates for the color-shifted reflectance characteristics of the surfaces 56. The light 31 is injected into the LOE 50 and coupled into the LOE 50 by the reflecting surface 54 that reflects the image 32 to be guided by total internal reflection, represented by ascending rays 32a and descending rays 32b of the image 32. As the image 32 propagates within lightguide 52, it impinges on partial reflectors 56. This impingement is at two angles (e.g., a first angle corresponding to ascending rays 32a and a second angle corresponding to descending rays 32b) thereby generating two reflections. Dashed-arrows 34 represent undesired reflection at shallow angles (in this example 74-85 degrees from vertex). The transmitted image continues to impinge at different angles on facets 56 (in this example 42-72 degrees from vertex), which reflect the image 33 (dot-dashed arrows) out of the LOE 50 onto the EMB 70.

The light output coupling elements 56 of system 300 have chromatic reflectance for coupling light out of the LOE 50. The combination of the POD 60 and the mirror 63 produces the incident light 31 to be chromatic such that the incident light 32 as received by the one or more light output coupling elements 56 compensates for the chromatic reflectance of the light output coupling elements 56.

Methods

Figure 8:
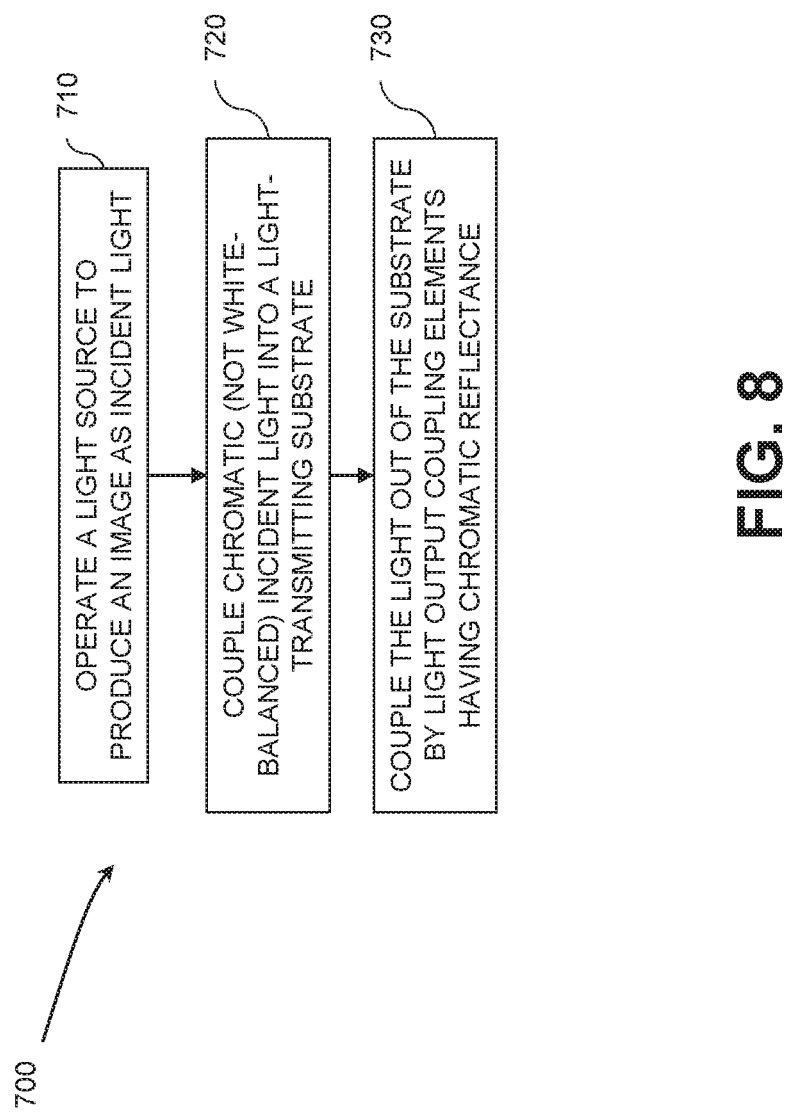
FIG. 8 illustrates a flow diagram for an exemplary method for generating an image in a NED.
Figure 10:
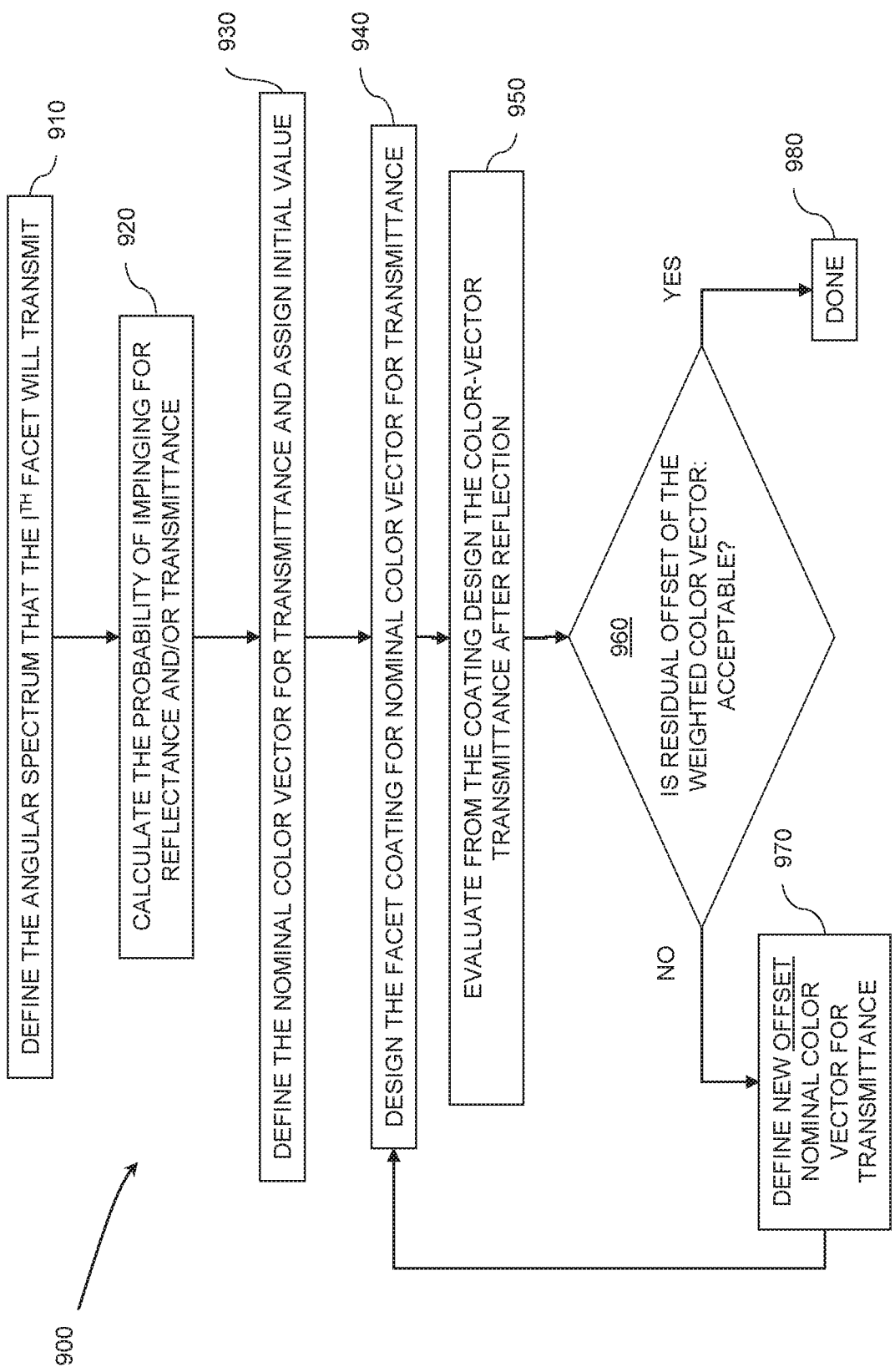
FIG. 10 illustrates a flow diagram for an exemplary method for designing coatings for facets of a light-guide optical element.

Exemplary methods may be better appreciated with reference to the flow diagrams of FIGS. 8 and 10. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 8 illustrates a flow diagram for an exemplary method 700 for generating an image in a near-eye display. At 710, the method 700 may include operating a light source to emit the image as incident light. The light source is configured to emit the incident light chromatically such that the incident light as received by the light output coupling elements compensates for the chromatic reflectance of the light output coupling elements. At 720, the method 700 may include coupling the incident light into a light-transmitting substrate thereby trapping the light between first and second major surfaces of the light-transmitting substrate by total internal reflection. At 730, the method 700 may include coupling the light out of the substrate by the light output coupling elements having chromatic reflectance. The resulting light out of the substrate is achromatic and, thus, the image is transmitted to a user of the NED as originally intended.

In one embodiment, the light source emits the incident light such that relative intensities of distinct light elements that compose the light source compensate for the chromatic reflectance of the one or more light output coupling elements.

In one embodiment, the light source emits the incident light such that relative intensities of red, green, and blue light sources that compose the light source compensate for the chromatic reflectance of the one or more light output coupling elements.

In one embodiment, operating the light source to emit the image as the incident light includes emitting the incident light achromatically, and reflecting the incident light using a mirror having chromatic reflectance to compensate for the chromatic reflectance of the one or more light output coupling elements.

In one embodiment, operating the light source to emit the image as the incident light includes emitting the incident light achromatically, and filtering the incident light using a mirror having chromatic reflectance to compensate for the chromatic reflectance of the one or more light output coupling elements.

In one embodiment, operating the light source to emit the image as the incident light includes emitting the incident light chromatically, and reflecting the incident light using a mirror having chromatic reflectance to compensate for the chromatic reflectance of the one or more light output coupling elements.

In one embodiment, operating the light source to emit the image as the incident light includes emitting the incident light chromatically, and filtering the incident light using a mirror having chromatic reflectance to compensate for the chromatic reflectance of the one or more light output coupling elements.

In one embodiment, the light source emits the incident light such that (a) relative intensities of distinct light elements that compose the light source compensate for the chromatic reflectance of the one or more light output coupling elements and (b) the relative intensities of the distinct light elements maximize overall efficiency of the light source.

In one embodiment, the light source emits the incident light such that relative intensities of distinct pixels projected by the light source compensate for the chromatic reflectance of the one or more light output coupling elements.

As discussed in detail below, in one embodiment, the one or more light output coupling elements include a light output coupling element coated with a coating optimized for three angular bands including two totally or near totally transmissive bands and one partially reflective band that is adjacent to one of the two totally or near totally transmissive bands. In one embodiment, transmittance of all three angular bands is optimized to preserve color uniformity.

Figure 9:
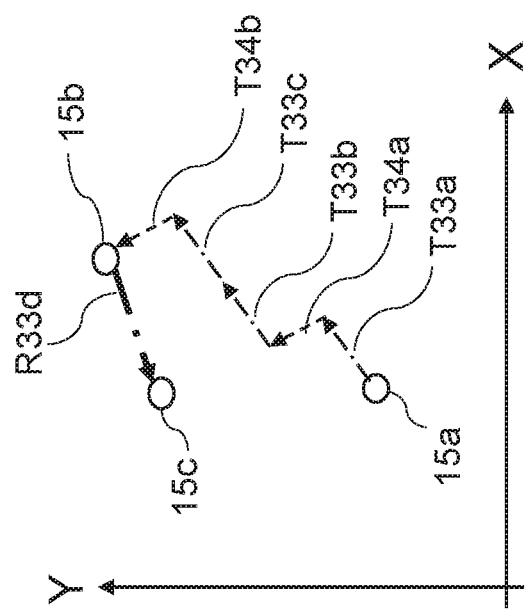
FIG. 9 illustrates a schematic diagram for an exemplary method for designing coatings for facets of a light-guide optical element.

FIG. 9 illustrates, in the color CIE 1931 XYZ color space or gamut space, the vectorial evolution of the light beam propagating within the LOE 50 of FIG. 1A. This vectorial domain was selected for clarity of explanation, but other representations are possible, such as 3D normalized transmittance representations where every dimension represents transmittance of one color. Here T33a represents the color vector of the guided light after reflectance 33a while T34a shows the color vector of the guided light influenced by reflectance 34a. Assuming the injected light 30 is white as represented by color vector 15a, then every reflection will move the color of the guided beam. This drift in color can be approximated as a vectorial summation to color location 15b that represents the color of the guided image just before output reflective vector R33d (33d in FIG. 1A). The color of the output beam is 15c and it can be represented as the vectorial sum:

$$15c = 15a + T33a + T34a + T33b + T33c + T34b + R33d$$

Thus, by pre-shifting 15a (the color of the injected image 30), it is possible to bring the output image color 15c (beam 33d) to be white balanced. However, if the color drift 15c-15a is too large, then this pre-compensation is no longer possible.

A way to minimize color drift of the guided image is to minimize the drift contributed by reflection 33 and reflection 34 in each facet 56 separately. The color shift contributed by each reflection must be weighted according to its relative probability to the relevant angular spectrum (i.e., which facet will transmit what angles). Here, we assume N34 is the probability of reflection 34 (representing T34a, T34b, ... ) of angular spectrum relevant for a facet further along the LOE 50 and N33 is the probability of reflection 33 (representing T33a, T33b, ... ) of angular spectrum relevant for a facet further along the LOE 50. We also assume that NR33 is the fraction of the energy reflected output as R33 onto the relevant angle for the facet that will make its path to the EMB 70. Then the following weighted color-vectorial summation of the three processes (the two transmissions and the one reflection), the average color-vector shift per facet, could be minimized for every facet:

$$N34 \times T34 + N33 \times T33 + NR33 \times R33 \rightarrow 0$$

In some configurations there may be more than one beam path traveling through the LOE 50. Therefore, the more general weighted summation will be on all relevant transmissions Ti and their angular spectrum with appropriate probability Ni and the one reflective beam Tr and its relative probability Nr:

$$\Sigma Ni \times Ti + Nr \times T \rightarrow 0$$

Other parameters could be considered for coating optimization but are not relevant for color optimization.

FIG. 10 illustrates a flow diagram for an exemplary method 900 for designing coating for every facet separately (here for the $i^{th}$ facet) in order to minimize the residual weighted color-vector and, thereby, minimize the required color pre-shifting (15a) of the injected image 30.

At 910, the method determines or calculates the relevant angular spectrum that the $i^{th}$ facet will transmit. This reduces the optimization complexity since different facets along the lightguide will transmit different angular spectrum of the image. For example, first facet 56a close to POD 60 will transmit (and introduce no color shift) for all the image angular spectrum, while facet 56c and facets farther away from the POD 60 will maintain color uniformity to only small angular spectrum. The last $n^{th}$ facet may not need to maintain color uniformity of transmitted image at all.

At 920, the method calculates the probability of light impinging on the $i^{th}$ facet for: reflectance: N33 (beam 33i) and/or transmittance: N34 (beam 34i) in the relevant angular spectrum. At 930, the method defines the nominal color vector for transmittance to be T34i (the transmittance beams in the relevant angular spectrum are each weighted by its respective probability) and assigns it an initial reference value. In one embodiment, the initial reference value may be set to T34i=0 but the designer may choose other initial reference values. At 940, the method designs the facet coating (a facet coating profile) for the nominal color vector for transmittance T34i. At 950, the method evaluates from the coating design the color-vector transmittance after reflection T33i. At 960, the method evaluates any residual offset of the weighted color vector. If the residual offset is not acceptable (fail), at 970 define a new offset nominal color vector for transmittance T34i and return to 940. This is, the designer may revise his initial assumptions and change the initial reference value. If, however, the residual offset is acceptable (pass), at 980, the design is complete. Pass/fail criteria could be global to the specific ($i^{th}$) facet or could be parameter specific (e.g., reflectance is too low or too high).

In one embodiment, this process may be simplified by ignoring the color-vector transmittance after reflection (set N33=0 or T33=0) and optimizing the coating only for: T34→0. In many cases this optimization will leave the total residual color 15c-15a to be small for preset compensation.

Figure 11B:
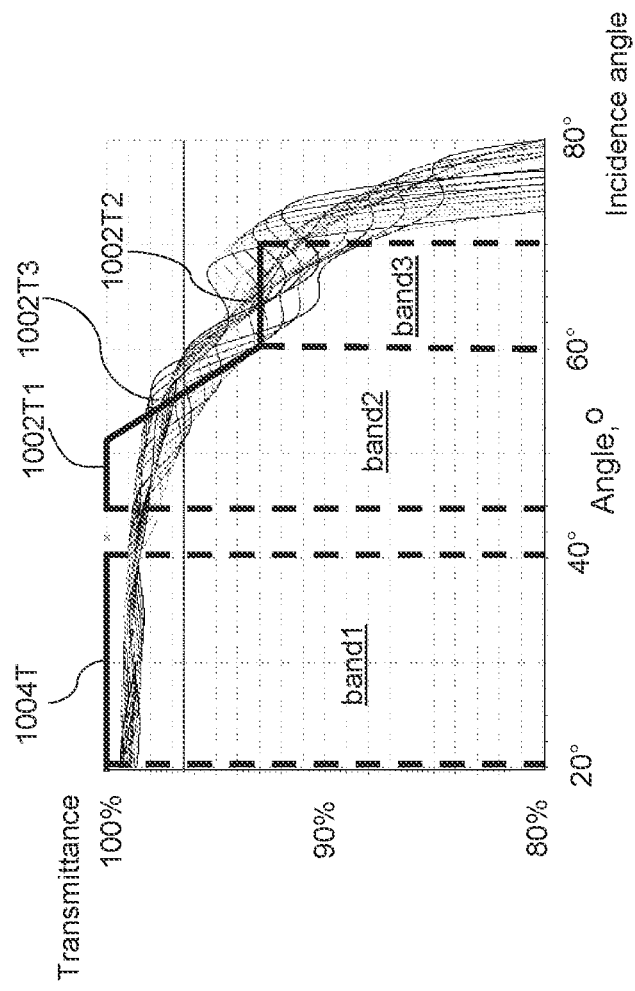
FIGS. 11B and 11C illustrate corresponding transmittance and reflectivity, respectively, as a function of incidence angle for the exemplary method for designing coatings for facets of a light-guide optical element of FIG. 11A.
Figure 11C:
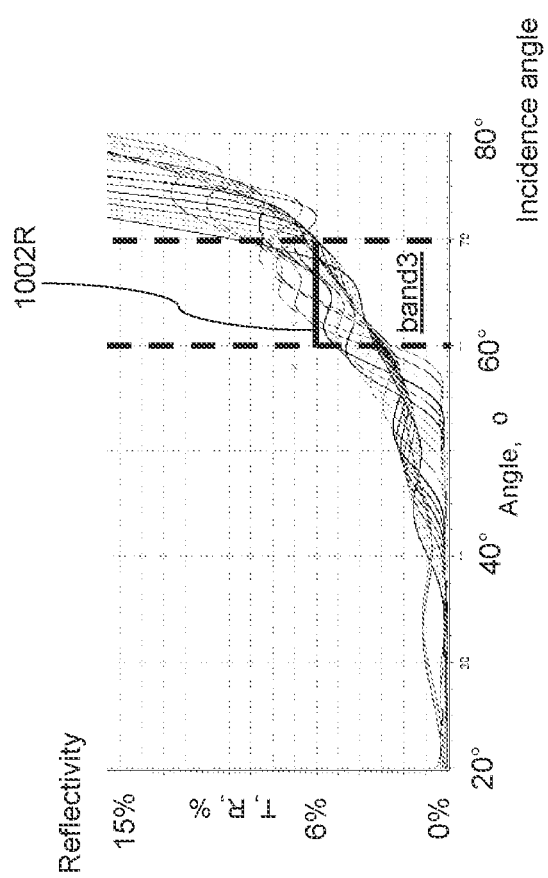

FIGS. 11A, 11B, and 11C illustrate an exemplary implementation of the above equation incorporating two transmissive and one reflective angular spectrums. FIG. 11A shows a portion of the LOE 50 to illustrate schematically the lightguide configuration (similar to that of FIG. 1A but reflectivity of a different angle). FIGS. 11B and 11C illustrate corresponding transmittance and reflectivity, respectively, as a function of incidence angle. The thick lines represent the required/designed transmittance and reflectivity, while the thin line plots illustrate experimental/achieved results at various different wavelengths.

The requirements are applied to a facet 56b at the center (i.e., not the first and not the last facet) of the LOE 50 where some of the light is reflected 33 and some is transmitted 34 so light may reach other facets (e.g., 56c) along the LOE 50. As shown in FIGS. 4A-4C, the beam 32 has low color spread. Here the beam 32 impinges on facet 56b at 1002 at some angle. In the example of FIGS. 11A-11C, the coating design for this angle should maintain color uniformity at the following specifications:

Angular spectrum 60 degrees to 70 degrees (band 3) should be reflected at 6% (1002R in FIG. 11C), 93% transmitted (1002T2 in FIG. 11B), and 1% assumed loss.

Angular spectrum 42 degrees to 60 degrees (band 2) should be fully transmitted (or nearly fully transmitted) at least for a portion (1002T1 in FIG. 11B) of the band. A practical gradually declining transmittance portion is assumed (1002T3 in FIG. 11B).

The light beam should transverse the facets (1004) with minimal reflection at 20 degrees to 40 degrees (band 1, 1004T in FIG. 11B). Near totally transmissive in this context means transmittance of 96.5% or higher. As seen in FIGS. 11B and 11C, coating design goals are generally achieved.

Thus, the facet 56b is coated with a coating optimized for three angular bands (in the example of FIGS. 11A, 11B, and 11C, band 1=20-40 degrees, band 2=42-60 degrees, and band 3=60-70 degrees) including two bands (band 1 and band 2) that have totally or near totally transmissive portions (1004T and 1002T1) and one band (band 3) that has a partially reflective portion (1002T2) and is adjacent to one of the two totally or near totally transmissive bands (band 3 is adjacent to band 2, which includes the portion 1002T1 that is totally or nearly totally transmissive). Transmittance of all three angular bands (band 1, band 2, and band 3) is optimized to preserve color uniformity of the system 100.

While the FIGS. illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed, and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. An optical system for a near-eye display (NED), the optical system comprising:
   a light-guide optical element (LOE) including a light-transmitting substrate having:
   first and second major surfaces parallel to each other,
   one or more light input coupling elements configured to couple incident light into the light-transmitting substrate thereby trapping the light between the first and second major surfaces by total internal reflection, and
   one or more light reflecting elements configured to at least partially reflect the light coupled into the substrate, the one or more light reflecting elements having chromatic reflectance; and
   a light source configured to emit the incident light such that the incident light as received by the one or more light reflecting elements compensates for the chromatic reflectance of the one or more light reflecting elements.

2. The optical system of claim 1, wherein the one or more light reflecting elements include one or more light output coupling elements configured to couple the light out of the substrate, the one or more light output coupling elements having chromatic reflectance for coupling the light out of the substrate; and
   the light source is configured to emit the incident light such that the incident light as received by the one or more light output coupling elements compensates for the chromatic reflectance of the one or more light output coupling elements.

3. The optical system of claim 1, the light source comprising:
   a light projector configured to emit the incident light chromatically to compensate for the chromatic reflectance of the one or more light reflecting elements.

4. The optical system of claim 1, the light source comprising:
   a light projector configured to emit the incident light such that relative intensities of distinct light elements that compose the light projector compensate for the chromatic reflectance of the one or more light reflecting elements.

5. The optical system of claim 1, the light source comprising:
   an RGB projector configured to emit the incident light such that relative intensities of red, green, and blue light sources that compose the RGB projector compensate for the chromatic reflectance of the one or more light reflecting elements.

6. The optical system of claim 1, the light source comprising:
   a mirror having chromatic reflectance and thus configured to receive the emitted light from the light projector and reflect it to compensate for the chromatic reflectance of the one or more light reflecting elements, or
   a filter having chromatic transmittance and thus configured to receive the emitted light from the light projector and transmit it to compensate for the chromatic reflectance of the one or more light reflecting elements.

7. The optical system of claim 1, the light source comprising:
   a light projector configured to emit the incident light such that relative intensities of distinct light elements that compose the light projector compensate for the chromatic reflectance of the one or more light reflecting elements, the relative intensities of the distinct light elements selected to maximize overall efficiency of the light projector.

8. The optical system of claim 1, the light source comprising:
   a light projector configured to emit the incident light such that relative intensities of distinct pixels projected by the light projector compensate for the chromatic reflectance of the one or more light reflecting elements.

9. The optical system of claim 1, the LOE comprising:
   a symmetrical beam multiplier region, distinct from a coupling-out region where the one or more light reflecting elements reside, the symmetrical beam multiplier region having n internal planar beam splitters, where n is a positive integer, each beam splitter being internal to the LOE and parallel to the major surfaces, the n beam splitters subdividing a thickness of the LOE between the major surfaces into (n+1) layers of equal thickness.

10. The optical system of claim 1, wherein the one or more light reflecting elements include a first light reflecting element coated with a first coating and a second light reflecting element coated with a second coating different from the first coating.

11. The optical system of claim 10, wherein the first coating is designed for a first nominal color vector for transmittance corresponding to the first light reflecting element and the second coating is designed for a second nominal color vector for transmittance corresponding to the second light reflecting element, the first nominal color vector for transmittance is different from the second nominal color vector for transmittance.

12. The optical system of claim 1, wherein the one or more light reflecting elements include a light reflecting element coated with a coating optimized for three angular bands including two bands that have totally or near totally transmissive portions and one band that has a partially reflective portion and is adjacent to one of the two bands that have the totally or near totally transmissive portions.

13. The optical system of claim 12, wherein transmittance of all three angular bands is optimized to preserve color uniformity.

14. A method for generating an image in a near-eye display, comprising:
   operating a light source to produce the image as incident light;
   coupling the incident light into a light-transmitting substrate thereby trapping the light between first and second major surfaces of the light-transmitting substrate by total internal reflection; and
   coupling the light out of the substrate or further down the substrate by one or more light reflecting elements having chromatic reflectance,
   wherein the light source is configured to produce the incident light chromatically such that the incident light as received by the one or more light reflecting elements compensates for the chromatic reflectance of the one or more light reflecting elements.

15. The method of claim 14, wherein the light source produces the incident light such that relative intensities of distinct light elements that compose the light source compensate for the chromatic reflectance of the one or more light reflecting elements.

16. The method of claim 14, wherein the light source produces the incident light such that relative intensities of red, green, and blue light sources that compose the light source compensate for the chromatic reflectance of the one or more light reflecting elements.

17. The method of claim 14, wherein the operating the light source to produce the image as the incident light includes:
  emitting light achromatically; and
  at least one of:
  reflecting the emitted light using a mirror having chromatic reflectance to compensate for the chromatic reflectance of the one or more light reflecting elements, or
  filtering the emitted light using a filter having chromatic transmittance to compensate for the chromatic reflectance of the one or more light reflecting elements.

18. The method of claim 14, wherein the operating the light source to produce the image as the incident light includes:
  emitting light chromatically; and
  at least one of:
  reflecting the emitted light using a mirror having chromatic reflectance to compensate for the chromatic reflectance of the one or more light reflecting elements, or
  filtering the emitted light using a filter having chromatic transmittance to compensate for the chromatic reflectance of the one or more light reflecting elements.

19. The method of claim 14, wherein the light source emits the incident light such that (a) relative intensities of distinct light elements that compose the light source compensate for the chromatic reflectance of the one or more light reflecting elements and (b) the relative intensities of the distinct light elements maximize overall efficiency of the light source.

20. The method of claim 14, wherein the light source emits the incident light such that relative intensities of distinct pixels projected by the light source compensate for the chromatic reflectance of the one or more light reflecting elements.

21. The method of claim 14, wherein the coupling the light out of the substrate includes coupling some of the light out of the substrate using a first light reflecting element coated with a first coating and coupling some of the light out of the substrate using a second light reflecting element coated with a second coating different from the first coating.

22. The method of claim 21, wherein the first coating is designed for a first nominal color vector for transmittance corresponding to the first light reflecting element and the second coating is designed for a second nominal color vector for transmittance corresponding to the second light reflecting element, the first nominal color vector for transmittance is different from the second nominal color vector for transmittance.

23. The method of claim 14, wherein the one or more light reflecting elements include a light reflecting element coated with a coating optimized for three angular bands including two bands that have respective totally or near totally transmissive portions and one band that has a partially reflective portion and is adjacent to one of the two bands that have the totally or near totally transmissive portions.

24. The method of claim 23, wherein transmittance of all three angular bands is optimized to preserve color uniformity.

* * * * *